July 1, 1930.  F. SCHAEFER  1,769,756
BRAKE LEVER
Filed March 12, 1930
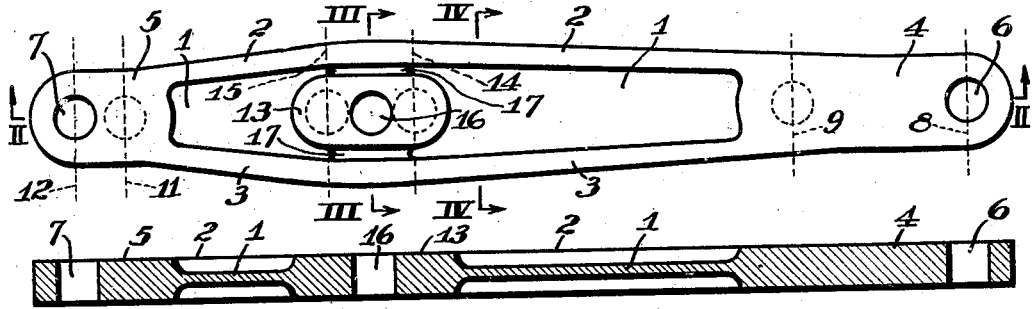
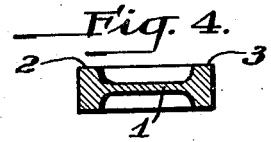
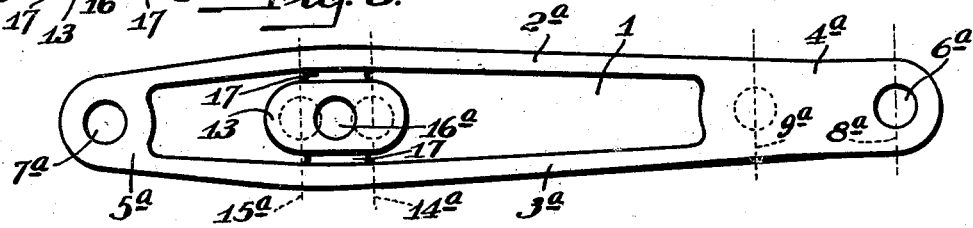
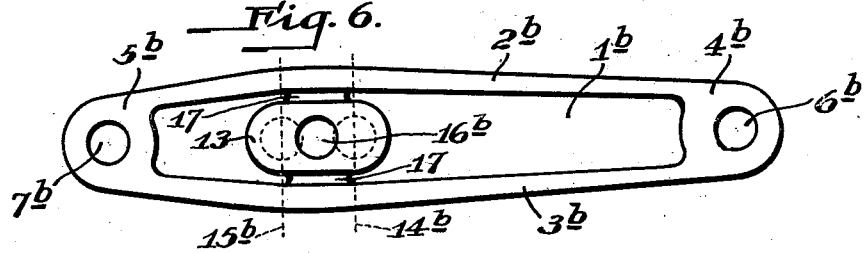
WITNESS
INVENTOR Patented July 1, 1930

1,769,756

UNITED STATES PATENT OFFICE

FREDERIC SCHAEFER, OF PITTSBURGH, PENNSYLVANIA

BRAKE LEVER

Application filed March 12, 1930. Serial No. 435,265.

This invention relates to brake levers such as are used in brake gears of railway passenger coaches, freight cars and the like.

In the construction of such brake gears the prevailing practice is to vary the length and ratio of leverage of the levers in accordance with the sizes of the car trucks, the weight of the cars, the maximum load for which the cars are designed, and various other conditions known to those skilled in the art. Consequently, many different lengths of levers, as well as levers having different ratios of leverages are required to satisfy the many different conditions of service. Heretofore each particular length of lever, as well as different ratio of lever arms, has been forged by a special set of dies, the different ratio of lever arms being determined by different spacings of its holes. Such practice necessarily involves the use of many different sets of forming dies which add considerably to the cost of manufacture.

The object of this invention is to provide a brake lever blank conforming in general shape to that of the usual brake lever, in which provision is made for varying the spacing of the holes, and for cutting the blanks to different lengths, so that different length levers as well as levers having different ratios of lever arms may be produced with a single set of dies.

The invention is illustrated in the accompanying drawing of which Fig. 1 is a face view of a brake lever blank formed in accordance with the invention; Fig. 2 a longitudinal central sectional view taken on the line II—II of Fig. 1; Figs. 3 and 4 transverse sectional views taken, respectively, on the lines III—III and IV—IV, Fig. 1; and Figs. 5 and 6 side views of two modifications of the invention.

In practicing the invention a brake lever blank, conforming in general shape to that of the customary brake lever now in use, is provided with excess metal at and intermediate of its ends so that it may be cut to various lengths to produce levers of different lengths within a limited range, and may be provided with end and intermediate pin holes at various spaced relationships to each other.

Having reference to the drawings, in Figs. 1 and 2 there is shown a forged brake lever blank comprising a web 1 and flanges 2 and 3 formed integrally with the web at its outer edges, the flanges merging together to form hole-receiving portions 4 and 5 at each end of the blank. These ends are prolonged to such an extent that end holes 6 and 7 may be drilled or otherwise formed at various points within the limits indicated by the dotted lines 8 and 9 for the end 4, and 11 and 12 for the end 5. The portion or portions of the blank beyond the holes are cut off to give the proper edge distance. This makes it possible to form many different lengths of levers from a single blank, as well as levers having different ratios of leverage, the extended end portions permitting variations in the spacing of the end holes with relation to the intermediate hole.

In the intermediate portion of the blank there is provided an elongate thickened section 13 in which, between the limits indicated by dotted lines 14 and 15, the intermediate hole 16 may be drilled or otherwise formed. The provision of this thickened section further permits the varying of the relative spacing of all the holes, and simplifies the production of levers conforming to the requirements of numerous conditions of service. Opposite to the thickened section, flanges 2 and 3 may, as shown, be extended in parallel relationship with grooves 17 between them and the thickened portion to lighten the structure.

In the modification shown in Fig. 5 only one end and the intermediate hole-receiving section 13 of the blank is formed to permit the holes to be variously placed for different conditions of service. In this case, only the longer end 4ª is extended for varying the length of the lever.

In the modification shown in Fig. 6 only the intermediate hole receiving section is formed for variation in the spacing relation of the holes. Although this latter modification does not permit the making of various lengths of levers from a single set of dies, it nevertheless permits the making, from a single set of dies, of blanks from which there may be formed a large number of levers having a different arrangement of holes or varying lever ratios.

As has been set forth, the advantage of the invention is the provision of a form of brake lever blank, which may be made by a single set of forging dies, and from which many different lengths of levers and levers having differently spaced holes may be readily produced, thereby making it possible to manufacture such levers at a greatly reduced cost.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as specifically illustrated and described.

I claim as my invention:

1. A forged brake lever blank having a web and flanges formed integrally with and at the edges of the web, the blank having an elongate thickened portion intermediate of its ends and between said flanges whereby the intermediate hole of the lever may be placed at a number of materially different positions in said elongated portion longitudinally of the blank, leaving sufficient metal around such hole.

2. A forged brake lever blank having a web and flanges formed integrally with and at the edges of the web, the blank having an elongate thickened portion intermediate of its ends and between said flanges whereby the intermediate hole of the lever may be placed at a number of materially different positions in said elongated portion longitudinally of the blank, leaving sufficient metal around such hole, and said blank having an extended thickened end whereby the end hole may likewise be placed at a number of materially different positions in said thickened end.

3. A forged brake lever blank having a web and flanges formed integrally with and at the edges of the web, the blank having an elongate thickened portion intermediate of its ends and between said flanges whereby the intermediate hole of the lever may be placed at a number of materially different positions in said elongated portion longitudinally of the blank, leaving sufficient metal around such hole, and said blank having both ends extended and thickened whereby the end holes of the lever may likewise be placed at a number of materially different positions in said extended ends.

In testimony whereof I sign my name.

FREDERIC SCHAEFER.